United States Patent [19]

Clabburn

[11] 4,045,604

[45] Aug. 30, 1977

[54] RECOVERABLE ARTICLE WITH OUTWARDLY EXTENDING HOLLOW HEAT FLANGES; KIT INCLUDING SUCH ARTICLE AND A CYLINDRICAL SUBSTRATE; AND METHOD OF MAKING SUCH ARTICLE

[75] Inventor: Robin J. T. Clabburn, Highworth, England

[73] Assignee: Raychem Limited, London, England

[21] Appl. No.: 620,405

[22] Filed: Oct. 7, 1975

Related U.S. Application Data

[63] Continuation-in-part of Ser. No. 513,111, Oct. 8, 1974, abandoned.

[30] Foreign Application Priority Data

Oct. 8, 1974 United Kingdom ............... 43536/74

[51] Int. Cl.$^2$ .................. B32B 1/08; H01B 17/56; B29C 27/24; F16H 55/48
[52] U.S. Cl. ..................... 428/36; 29/159 R; 29/447; 29/631; 74/230.7; 156/86; 174/73 R; 174/179; 174/209; 174/DIG. 8; 264/230; 428/542; 428/910; 428/913
[58] Field of Search ............ 174/73 R, 73 SC, 74 A, 174/75 R, 80, 178, 179, 209, 211, 212, DIG. 1, DIG. 8; 339/DIG. 1; 29/159 R, 447, 631; 74/230.7; 156/84–86, 293, 294; 264/230, DIG. 66, DIG. 77; 337/186, 246, 248; 428/36, 188, 542, 910, 913

[56] References Cited

U.S. PATENT DOCUMENTS

| | | | |
|---|---|---|---|
| 3,604,830 | 9/1971 | Frakes | 174/211 X |
| 3,808,352 | 4/1974 | Johnson | 174/73 R |
| 3,950,604 | 4/1976 | Penneck | 174/73 R X |

FOREIGN PATENT DOCUMENTS

| | | | |
|---|---|---|---|
| 1,056,223 | 4/1959 | Germany | 174/73 R |
| 1,918,451 | 11/1969 | Germany | 174/73 R |
| 1,292,276 | 10/1972 | United Kingdom | 174/179 |

OTHER PUBLICATIONS

Ash et al., "Heat-Shrinkable Plastics for Termination and Jointing of Power and Auxiliary Cables," *Proceedings IEE*, vol. 117, No. 7, July 1970, pp. 1365-1372.

*Primary Examiner*—Laramie E. Askin
*Attorney, Agent, or Firm*—Lyon & Lyon

[57] ABSTRACT

A hollow structure for use as an electrical insulator or other similar structure having outwardly disposed flanges extending circumferentially thereabout. The hollow structure includes a hollow member of heat recoverable material positionable about a central insulator core, electrical conduit, fuse or other substrate. The outwardly extending flanges are integrally formed with the hollow member and extend radially therefrom in the dimensionally heat stable state. The hollow member is designed to be expanded to a heat recoverable state for later facile positioning about an appropriate substrate. The hollow member may then be heat recovered about the substrate to become securely positioned thereon. Proper selection of the hollow member as to its dimensionally heat stable inner diameter relative to the inner diameter of the substrate results in control of the orientation of the flanges once the hollow structure has been recovered about the substrate.

9 Claims, 7 Drawing Figures

RECOVERABLE ARTICLE WITH OUTWARDLY EXTENDING HOLLOW HEAT FLANGES; KIT INCLUDING SUCH ARTICLE AND A CYLINDRICAL SUBSTRATE; AND METHOD OF MAKING SUCH ARTICLE

RELATED APPLICATIONS

This is a continuation-in-part of application Ser. No. 513,111, filed Oct. 8, 1974 (now abandoned).

Further, this is a composite of U.S. application Ser. No. 513,111, filed Oct. 8, 1974 (now abandoned) and British application No. 43536/74, also filed Oct. 8, 1974 for which priority is claimed.

The present invention is directed to a structure having outwardly disposed flanges extending circumferentially thereabout and a method of forming same. More specifically, the present invention is directed to insulator bodies having integral sheds extending therefrom and the method of making same.

In the high voltage field insulators (or insulating units) may be used, for example, to support overhead power lines, the insulators being either under compression or under tension, or, in the case, of, for example, post insulators in sub-stations and bushings on transformers and switchgear, to provide a satisfactory ledkage distance between those parts of the equipment that are at a high potential and those parts which are grounded. The outer surface of an insulator used as indicated above is generally provided with a number of outwardly extending flanges or sheds to increase the creepage distance and flash-over voltage and to reduce leakage currents. The sheds usually project from the body of the insulator either radially or obliquely. An insulator having a plurality of radially disposed sheds is relatively simple to manufacture, whereas an insulator having a plurality of oblique sheds must either be made in separate parts each part having one oblique shed, the parts being joined together by some means, for example, bonding, to form multiple units, or cast or molded as multiple units using costly tooling which is capable of being opened without damage to the obliquely arranged sheds. Whatever angle of projection of the sheds from the insulator body is chosen, for one insulator, the angle is usually the same for each shed. Sheds which project from the insulator body at an angle other than 90° provide a number of protected areas which help to improve the overall performance of the insulator especially in polluted outdoor environments. As is well known to those skilled in the art, a shed is a flange member which extends outwardly from the surface of the insulator and around the circumference thereof to provide the insulator with a circumferential rib, skirt or fin.

In the past, insulators of the above type have generally been fabricated from an insulating material such as porcelain or, in the case of suspension insulators, glass. The smaller units, for example 33 KV post insulators and 11 and 33 KV bushings for transformers and switches, are fabricated as single units in porcelain, the sheds projecting at an angle appropriate to the use and in the case of bushings being hollow to allow them to receive the metal component at high potential. The manufacturer uses the traditional method for manufacturing porcelain, ceramic or pottery-like items which allow almost any shed angle or configuration to be achieved. As the size increases, the manufacture of one-piece insulators becomes more difficult and insulators are normally manufactured in a number of separate units which, in the case of bushings and post insulators, are generally cemented together to form the composite structure and in the case of suspension insulators, are generally connected by metal fittings which are cemented to the glass or ceramic. Although insulators made as indicated above are advantageous in that relatively inexpensive starting materials are used, they have the disadvantage that they are expensive, heavy and relatively fragile.

Recently proposals have been made to make insulators from plastic materials where, in general, the previously described in fabrications processes are inappropriate. The most commonly used material have been epoxy resins and silicone elastomers, and the insulators, or insulator components, have been made by a casting or molding process. Thus, for example, British Patent Specification No. 1,345,566, incorporated herein by reference, describes a strain insulator in which the insulator body is composed of an organic material and formed with a plurality of radially placed skirts or hoods. A central core member, typically a fiberglass rod to which end fittings are attached, is embedded in the insulating body. This insulator has the disadvantage that the central core member must be embedded in the insulator body during the molding process. Such an integral molding method, because the resulting insulator is not heat shrinkable, has the disadvantage that a different mold is required for each size of insulator and it would be advantageous if the insulator body having integral sheds could be made separately from the central core member, and the sheds inclined to the axis so that the strain insulator could be assembled after manufacture of the individual components.

A proposal has been made to make an insulator by bonding a number of individual sheds to a glass fiber core. Thus, for example, British Specification No. 1,292,276 describes the installation of a number of individual heat shrinkable sheds on a central support. Even when heat shrinkable sheds are used, however, the manufacture and installation of a number of separate sheds is inevitably time consuming, and may lead to undesired variations in quality in the final product, and it would be advantageous if the sheds could form part of an outer covering which could be applied to the central support as a single unit. Attempts to provide an insulator with an outer covering by molding a tubular member having a number of integral sheds, converting the member to a heat shrinkable form, and then shrinking it round a suitable substrate some 25% larger in diameter than the molded internal diameter of the tubular member did not, however, prove successful as air became trapped between the member and the insulator and the sheds became distorted such that they were no longer uniformly aligned to the surface of the substrate. Such distortion occurred at random, some sheds forming an acute angle with the longitudinal axis of the member and some an obtuse angle, with the result that not only was the final appearance unsatisfactory, but in some cases the outer extremities of the sheds were so close together that arcing could occur between adjacent sheds. Furthermore, upwardly inclined sheds would tend to collect water if the insulator were used out of doors, with the result that the electrical properties of the assembly would be impaired. The resulting product was not significantly improved when recovery was carried out in a vacuum oven thus removing the entrapped air.

Furthermore, such an integral molding method is only practical when the plane of each shed is perpendicular to the longitudinal axis of the insulator as an obliquely oriented shed would define an undercut section between the shed and the body of the insulator that would impede the opening of a simple mold almost certainly resulting in damage to the shed during opening of the mold. A mold capable of overcoming this limitation could be constructed but this would be very much more complicated and costly. However, when such an insulator is to be used in damp and/or polluting conditions, its performance is much inferior to that of a similar insulator the sheds of which are inclined in a downward direction, typicaly at an angle of 15° to 30° to the horizontal. This ensures that when the insulator is mounted vertically, water will run off and the under side of the sheds will remain relatively dry.

Previously proposals for manufacturing insulators with inclined sheds from plastic materials have, because of the difficulties mentioned above, in general, involved the separate molding of individual sheds or shedded insulator portions, and the assembly of a number of separate units to form the complete insulator. Individual sheds may be molded with a part line at the outer edge of the shed, and hence, there is no problem with undercut sections. Again, the manufacture and installation of a number of separate sheds is inevitably time consuming and may lead to air entrapment and other undesired variations in quality in the final product.

SUMMARY OF THE INVENTION

The present invention provides a hollow member having outwardly disposed flanges and a method for making composite structures employing such hollow members. The present invention, especially, provides an article comprising a hollow member outwardly disposed flanges which can be converted to a first heat recoverable state in which the flanges extend outwardly in a radial direction or in an oblique direction and which, upon the application of heat, partially recovers to a second heat recoverable state about a substrate, in which second heat recoverable state said flanges extend outwardly in a controlled and uniform manner which may, for example, be in a radial or in an oblique direction.

An outwardly extending portion is said to extend radially from the hollow article if a straight line from the outermost extremity of the outwardly extending portion and perpendicular to the longitudinal axis of the hollow article passes along the surface of, or through, the outwardly extending portion, while an outwardly extending portion extends obliquely from the hollow article when it is not perpendicular to the longitudinal axis of the article. The outwardly disposed flanges extend around at least part of the periphery of the hollow member. These flanges are integrally molded as part of the hollow member and extend radially, i.e. perpendicular to the center line of the hollow member, when molded. The hollow member may be expanded to form a heat recoverable product positionable about a central insulator core, electrical conduit, fuse or other substrate. The heat recoverable article may then be recovered to be securely positioned on the substrate. For electrical applications it is essential that all the flanges of the article extend outwardly from the tubular portion of the article in the same general direction both in the first and second heat recoverable states. It is preferable that the outward direction of the flange is generally the same in the first heat recoverable state as it is in the second heat recoverable state. Upon expansion of the hollow member, the flanges may become obliquely oriented to the longitudinal centerline of the hollow, heat recoverable article, or they may be held during expansion so that they remain outwardly extending in a radial direction when the article is expanded to the first heat recoverable state. This can be achieved by, for example, clamping the flanges or by fitting a comb-like mechanical means around the article.

It may be desirable, but not essential, that the holding means be employed during recovery of the article to the second heat recoverable state about a substrate. The oblique orientation of the outwardly extending flanges creates an undercut section between one side of each outwardly extending flange and the body of the hollow member. The degree of recovery of the article and the angle which an oblique flange makes in the second heat recoverable state with the longitudinal axis of the insulating member upon application of the heat may be controlled by properly selecting the appropriate sized hollow member for a given substrate. When a composite structure having substantially radially extending flanges is desired, the dimensionally heat stable inner dimensions of the hollow member are chosen to by slightly smaller than the corresponding outer dimensions of the substrate. On the other hand, partial heat recovery of the article having outwardly extending oblique flanges on to a substrate having a proportionally larger diameter will hold the flanges in an oblique configuration. Control over the orientation of the outwardly disposed flanges is accomplished while allowing the use of simple rather than complex molding techniques. In each case, the hollow members are molded with radially extending flanges even though the final product may, upon assembly, include undercut portions thereon. Thus, the problems associated with molding and assembling such insulators from plastic material are overcome by the present invention.

When it is desired to provide a composite structure comprising a hollow article of the invention positioned and heat recovered onto a substrate, the hollow article when heat recovered about the substrate having radially disposed flanges, the dimensionally heat stable inner size of the hollow member should be only slightly smaller than the substrate. If a plastic material is selected for the hollow member which has a relatively high degree of thermal expansion, the inside dimension of the hollow member may be substantially equal to the outside dimension of the substrate at the recovery temperature. In such an instance, heat recovery would be substantially complete and the flanges oriented exactly as molded at the time the hollow member passes through the recovery temperature. Further cooling to room temperature then results in the contraction of the hollow member about the substrate as a result of the disparity in the degree of thermal expansion between them, the flanges remaining oriented as molded.

To avoid the problems of air being trapped between the hollow member and the substrate, a slightly polygonal inner surface may be given to the hollow member for use with a generally cylindrical substrate such that channels are provided through which air can escape during recovery.

Although the flanged structure of the present invention, when made of appropriate materials, is particularly suitable for use as an insulator, composite structures made according to the present invention may be used for other purposes readily apparent to those skilled in the art including, for example, pulleys and reels. Such devices may also be longitudinally split so that they may be wapped about, rather than threaded onto suitable substrates.

Accordingly, it is an object of the present invention to provide a heat-shrinkable article having outwardly extending flanges which has been molded simply. It is a further object of the present invention to provide a composite structure incorporating easily molded elements which may be controllably heat recovered to assume a selected final configuration having radially or obliquely oriented flanges.

It is another object of the present invention to provide a method for providing a plurality of outwardly disposed flanges about an unflanged substrate.

It is another object of the present invention to provide a method for molding and fabricating composite structures employing simple molding techniques and resulting in a complex configuration.

It is a further object of the present invention to provide an improved insulator and method of forming same.

Further objects and advantages will appear hereinafter.

DETAILED DESCRIPTION OF THE PREFERRED EMBODIMENT

Figure 1:
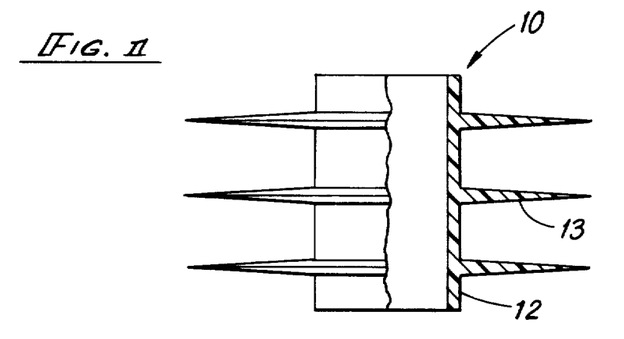
FIG. 1 illustrates in elevation and partially in section a hollow article of the present invention.

Referring now to the drawings, an insulator employing the present invention is illustrated by way of example. FIG. 1 shows a hollow article, generally designated 10, of electrically insulating material which comprises a central tubular portion 12 which is the hollow member of the article, and a plurality of integrally formed, outwardly extending flanges which constitute sheds 13 when used as an electrical insulator. Each shed 13 extends around the entire periphery of the tubular portion 12 and also extends radially from the tubular portion 12 making each shed perpendicular to the longitudinal axis of the tubular portion 12.

The hollow article 10 is thus configured so that a longitudinally split mold can be removed from the hollow article 10 in a direction substantially perpendicular to the longitudinal axis of the tubular portion 12 without substantial deformation of the sheds 13.

Some latitude in the radial configuration of the sheds 13 is permissible in the as-molded state provided that the mold may be easily removed by moving laterally with respect to the center line of the central tubular portion 12. Thus, the sheds 13 may vary from a truly perpendicular orientation as long as an undercut portion is not created requiring the deformation of either the mold or the sheds 13 during lateral movement of the mold from the hollow article 10. The lack of undercut portions on the unexpanded hollow article 10 significantly simplifies molding of the hollow article 10.

Each outwardly extending flange of the hollow article 10 extends around at least part of the periphery of the tubular portion 12. If the outwardly extending flanges are the sheds 13 of electrically insulating material, these sheds 13 are advantageously continuous, extending around the entire periphery of the hollow member 12. For other uses, however, outwardly extending flanges which extend around only part of the periphery may be suitable, provided that each outwardly extending portion extends around the member by such an amount that the desired distortion of the outwardly extending flanges occurs on the expansion of the tubular portion 12. Where the outwardly extending flanges extend around only part of the periphery of the member, the member may be made in a wrap-around form including a longitudinal seam made in the member 12 after molding. In an alternate embodiment, the outwardly extending flanges may extend helically around the longitudinal axis of the member 12 in such situations where this would be advantageous.

The hollow article 10 used according to the present invention may comprise any material that may be converted to a heat recoverable state. The nature of the material in part dictates the use to which the composite structure is to be put. In the illustrated embodiment, the composite structure is to be used as a high voltage insulator. Thus, at least, the outer surface of the hollow article 10 should comprise a non-tracking electrically insulating material.

A non-tracking material may be defined as one which has an initial tracking voltage of more than 3 KV when tested in accordance with ASTM-D2303-64T which employs the inclined plane liquid contamination test to represent service exposure of insulators under polluting conditions. Examples of non-tracking materials which may be converted to a heat recoverable state are disclosed in the following British Patent Specifications, the disclosures of which are incorporated herein by reference: No. 1,292,276; No. 1,284,081; No. 1,284,082; No. 1,303,432; No. 1,337,951; and No. 1,337,592. Also see U.S. Patent application Serial Nos. 273,991, filed July 21, 1972 now issued as U.S. Pat. No. 3,969,308; Ser. No. 274,110, filed July 21, 1972, now Pat. No. 4,001,128; and Ser. No. 81,558, filed Oct. 16, 1970 abandoned in favor of continuation-in-part application Ser. No. 434,126 now abandoned. The hollow article 10 may be molded, for example, by compression, transfer or injection molding, and when any superfluous material has been removed, may be expanded by any desired method, either automatic or manual.

Figure 2:
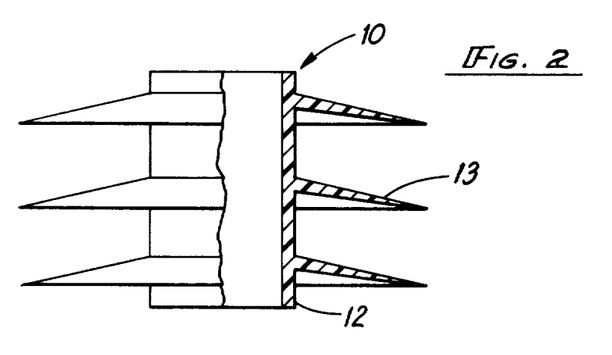
FIG. 2 illustrates in elevation and partially in section the article of FIG. 1 in heat shrinkable form.

FIG. 2 illustrates the article of FIG. 1 in a first heat-recoverable form. The inner diameter of the tubular portion 12 has been expanded, causing sheds 13 to assume an oblique orientation relative to the tubular member 12. In this expanded configuration, the sheds 13 define on one side thereof undercut sections. Such a configuration is not easily molded because the undercut sections associated with the sheds 13 prevent lateral retraction of a simple mold from about the completed hollow article 10. The oblique orientation is achieved by the expansion of the tubular portion 12 of the hollow article 10, and the stretching of the material of the sheds 13 at the outer surface of the hollow member 12.

The polymeric material forming the outer extremity of the sheds may not itself be strained to the same extent as that of the tubular portion as a result of the expansion of the hollow article. The oblique orientation of the sheds about the tubular portion is caused by the material of the sheds attempting to accommodate the increased inner circumference of the tubular portion 12 relative to the outer circumference of the sheds unless otherwise restrained. As the tubular portion 12, the sheds 13 and the degree of expansion are relatively uniform along the length of the hollow article 10, the distortion of the sheds 13 of similar geometry is uniform.

During expansion of the hollow member 12, the sheds 13 may distort from the dimensionally heat stable radial configuration in different directions. In some instances, the direction in which the outwardly extending flanges distort may be irrelevant, the important factor merely being that these portions should be inclined at a selected angle to the longitudinal axis of the structure in the the final configuration. However, for electrical applications the direction of inclination is important. Thus, in an insulator, for example, all of the sheds 13 should normally extend outwardly in the same direction while, in the case of a pulley or reel, each first outwardly extending flange is advantageously inclined in a direction opposite to that of each second flange.

When the direction of distortion is important, the outwardly extending flanges must either be so constructed that they inevitably distort in the selected direction, or that the movement away from the radial, dimensionally heat stable position must be controlled so that it takes place in the selected direction. This can readily be done by mechanical means. A comb-like means may be used whch has a number of suitably spaced teeth or plates which can be brought into abutting relationship with the outwardly extending flanges so that movement in the wrong direction is prevented.

Where the distortion takes place during expansion from the heat stable state to the first heat recoverable state, the distortion or inclination in the first heat recoverable state will be retained in part on partial recovery of the article to a second heat recoverable state. This has the advantage that the direction of inclination of the sheds of the final article (on a cylindrical substrate) can be predetermined during the manufacture of the heat recoverable article.

Figure 3:
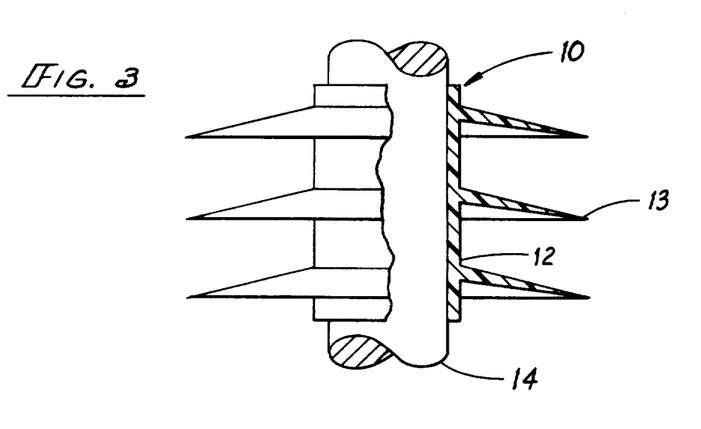
FIG. 3 is an elevational view partially in section of the article of FIG. 1 partially recovered on a core.

A complete composite structure designed to include oblique flanges extending from the hollow member is illustrated in FIG. 3. A core 14, which may be a fuse, is positioned in the hollow article 10 when it is in its first heat recoverable state as seen in FIG. 2. The hollow article 10 is then raised to its recovery temperature and is allowed to partially recover to its second heat recoverable state until it is securely positioned about the core 14. The hollow article 10 is then allowed to cool in contracted engagement with the core 14. The inner diameter of the hollow member 12 is designed for each size and shape of the intended core 14 such that the hollow member 12 will not be allowed to recover completely to its unexpanded state. Thus, the outwardly extending flanges will not return to a substantial radial configuration. Rather, they will assume some intermediate oblique position between the distortion associated with the first heat recoverable state and the unexpanded state of the hollow article 10. As the degree of distortion is readily predictable, the unexpanded shape of a hollow article 10 for a given core 14 and for a given angle of distortion of the flanges is easily determined.

The preferred angle of distortion of the outwardly extending flanges of the article recovered to its second heat recoverable state about a substrate, that is, the composite structure of the invention, will of course, depend on the use to which the composite structure is to be put. If for example, the composite structure is to be used in highly polluting conditions as a non-tracking insulator or a termination for high voltage electrical components, the angle at which the optimum working voltages are obtained will depend on the dimensions of the article, the operating voltage and the wetting characteristics of the outer surface of the article. This may all be readily determined by those skilled in the art. For some high voltage applications, it has been found advantageous to use sheds 13 inclined at an angle of 15° to 30° to the perpendicular (75° to 60° to the longitudinal axis of the hollow member 10).

Figure 6:
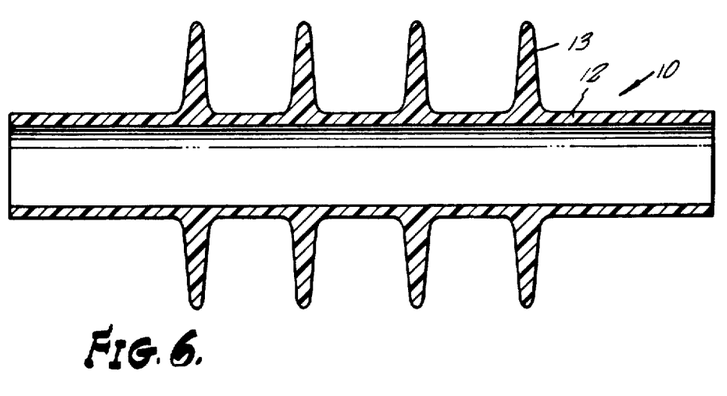
FIG. 6 is a cross-sectional view of another embodiment of the present invention in its unexpanded state.
Figure 7:
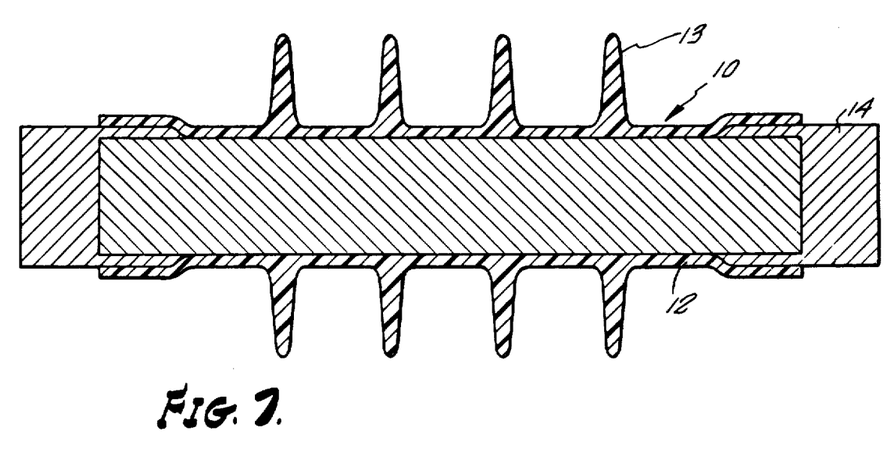
FIG. 7 is a cross-sectional view illustrating the embodiment of FIG. 6 partially recovered about a core.

In the article of the invention where radially disposed flanges are desired in the final product, the inner dimensions of the recoverable article when recovered in the absence of a substrate are only slightly smaller than the corresponding outer dimensions of a substrate for which the article is designed. Some slight difference in these dimensions is necessary since if these two dimensions were identical, the article would not exert any recovery force on the substrate. By insuring that the difference is small, however, it is possible to insure that the article when fitted exhibits minimal unresolved recovery (that is it has almost returned to the original dimensions in which it was molded), so that there is little or no tendency for the outwardly extending portions to be deformed by internal stresses in the article. FIG. 6 illustrates a hollow article 10 of the present invention and FIG. 7 illustrates the hollow article 10 recovered to its second heat recoverable state about a substrate 14. In the second heat recoverable state the article 10 is shown to have radially extending flanges 13. When the heat recoverable article is made of a material of which the thermal expansion is high compared with that of the substrate, forces between the article and the substrate after recovery of the article into contact with the substrate but while still at the recovery temperature will be virtually zero. In other words, if the article had been heated without restraint from the 'as molded' form to the recovery temperature, the article would have virtually the same internal dimensions as the external dimension of the substrate.

Although the preferred difference between the outer dimensions of the substrate 13 and the corresponding inner dimensions of the article 10 in its dimensionally heat stable state will depend on the circumstances, the inner dimensions of the dimensionally heat stable article are preferably not more than 13% smaller than the equivalent outer dimensions of the substrate. If the difference in dimensions is too small, however, there will be a danger that a heat recoverable article made of a material of which the thermal expansion is high compared with that of the substrate will not contact the substrate at the recovery temperature, thus enabling air to be trapped between the article and the substrate. For such a heat recoverable article, the difference in the linear dimensions is preferably not less than 2%.

The inner surface of the heat recoverable article of the invention is advantageously shaped to facilitate escape of air from between the article and the substrate during recovery. Thus, for example, the inner surface may have one or more longitudinally extending grooves therein. Alternatively, the cross section of the inner surface of the article in its first heat recoverable state may be different from the cross section of the substrate, giving channels along which air can escape during recovery. Thus, for example, the heat recoverable article may have a polygonal inner surface (which may, for example, be produced by the use of a mandrel having a polygonal outer surface to expand the article) while the substrate has a generally cylindrical outer surface.

The exact nature of the core 14 or support member of the composite structure of the invention will also depend on the use to which the structure is to be put. The composite structure may be employed as an insulator, an electrical component, a fuse, transformer bushing, insulator post, pulley or reel or may be a high voltage termination. Thus, when the composite structure is to be used as an insulator, the core advantageously comprises a fibre reinforced electrically insulating material; details of suitable electrically insulating materials are given for example, in British Patent Specification No. 1,292,276. Alternatively, there may be situations where the heat recoverable hollow article 10 is to provide insulation for an electrical component, and in that case the core 14 may comprise an electrically conductive material, for example, an electrical component, bushbar, cable or the like. It will be understood that the invention is in no way limited by the shape or nature of the core 14 or of the material from which it is made, and that the core 14 may comprise any object or objects that are capable of preventing complete recovery of the heat recoverable article 10.

If desired, the interface between at least a portion of the inner surface of the heat recoverable hollow member and at least a portion of the substrate may be provided with one or more layers of a material which imparts to the inner surface one or more desirable characteristics such as for example, adhesiveness, repellancy to liquids, for example, water or organic solvents, or electrical properties, for example, stress grading properties or track-resistant properties. Of course, the layer of material may be disposed on at least the portion of the heat recoverable hollow member and/or on at least a portion of the outer surface of the substrate.

A sealant which may be a hot melt adhesive, mastic or thermosetting adhesive, may be used to bond the hollow article to the core 14 used in the composite structure of the invention. Suitable adhesives include epoxy resins (either hot or cold cured) and polyesters. These resins and polyesters may be used with or without fillers and silicone containing adhesives, especially those with non-tracking properties. Other suitable adhesive compositions include those comprising a copolymer of a hydrocarbon containing at least one polymerizable double bond and a compound containing a polymerizable double bond together with one or more carboxylic acid groups, which carboxylic acid groups may be in the form of a derivative such as an ester or an anhydride. As examples of such copolymers, there may be mentioned ethylene/vinyl acetate copolymers, ethylene/ethyl acrylate copolymers, methyl vinyl ether/maleic anhydride copolymers and preferably, alkyl esters of methyl vinyl ether/maleic anhydride copolymers. At least a portion of the surface of the hollow article 10 which is to contact the core 14 or substrate may be provided with a stress-grading material or layer which can act to reduce the electrical stress which may exist in various areas of high voltage components such as at the end of the screen of a high voltage cable.

A stress grading material or layer is suitably a material or layer with non linear electrical resistance properties and may have form stability or may comprise a substantially non-crystalline material (for example, a mastic-like material) which has a viscosity of not more than $10^{13}$CP at 25° C. Examples of suitable stress grading materials are given in U.S. patent application Ser. Nos. 453,165 filed Mar. 20, 1974 (now abandoned), and 393,509 filed Aug. 31, 1973 now U.S. Pat. No. 3,950,604. The stress grading material or layer may, in certain circumstances, comprise a material which has linear electrical resistance characteristics. The material may comprise suitable fillers which impart linear electrical resistance characteristics to the material which otherwise does not have a linear electrical resistance. Such fillers include for example, one or more of carbon black and metal particles.

For compounds having stress grading electrical characteristics which may be incorporated in a polymer base comprising, for example, a blend of two or more polymer materials together with any number of conventional fillers, for example, processing aids, plasticizers, stabilizers, antioxidants, coupling agents, further modified or unmodified fillers and/or cure systems, there may be mentioned, for example, carbon black or silicon carbide particles, flakey metals, for example those described in U.S. Pat. No. 3,349,164, and the materials of British Patent application No. 13352/73, the disclosures of which are incorporated herein by reference.

The layer of a material may comprise a grease, for example, a silicone grease or an oil, for example, a silicone oil.

It will be understood that the circumference of each flange of the article according to the present invention may be different depending on the optimum design of the article.

The following examples illustrate the invention.

EXAMPLE 1

An article was molded in the form similar to that shown in FIGS. 1 and 6, the inner diameter of the tubular portion 12 being 5.71 cm. and the distance (measured perpendicular to the longitudinal axis) between the outer extremity of each shed 13 and the inner surface of the tubular portion 12 was 2.54 cm. The sheds, which were symmetrical about a plane perpendicular to the longitudinal axis, were perpendicular to that axis.

In the expanded form shown in FIG. 2, the inner diameter of the tubular portion 12 was 8.08 cm. and the distance measured perpendicular to the longitudinal axis) between the outer extremity of each shed 13 and the inner surface of the tubular portion 12 was 2.00 cm. The angle of inclination of each shed was 60°. The angle of inclination is that acute angle defined by the centerline of the hollow member 12 and a line extending outwardly from the centerline of the hollow member 12 through the center of a shed 13 equidistant from each surface of the shed 13. In the partially heat-recovered form shown in FIG. 3, the diameter was 8.00 cm., the distance was 2.03 cm. and the angle of inclination was 80°.

EXAMPLE 2

Experiments were carried out to investigate the way in which the angle of inclination of an outwardly extending portion in a member according to the invention varies with the degree of expansion of the member.

A number of parts were molded from electrically insulating material. The parts were identical, each consisting of a central tubular portion 12 having an overall length of 16.5 cm and outer diameter of 2.2 cm and provided with 4 integral symmetrical sheds 13, the distance between adjacent sheds being approximately 2.54 cm. In the "as-molded" article, each of the sheds was perpendicular to the longitudinal axis of the tubular portion.

Each of the parts was then heated in a glycerine tank at 160° C and expanded to a heat recoverable state by means of a Teflon mandrel. On such expansion, the sheds distorted so that they were no longer perpendicular to the longitudinal axis of the tubular portion, and the angle $a$ between the upper outermost surface of each shed and the longitudinal axis of the tubular portion was determined by measuring the shed diameter (S.D.)., the shed length (S.L.) and the outer diameter (O.D.) of the tubular portion, the angle being calculated according to the equation $$\sin a = \frac{S.D. - O.D.}{2 \times S.L.}$$

In some cases the parts, having been expanded once, were expanded again, the angle $a$ being determined for each of the expanded states. Thus in Table I, which is set out below and indicates the internal dimensions of the expanded parts, state D, wherein the internal diameter was 3.02 cm., was obtained by expanding a part with an "as molded" internal diameter of 1.90 cm. to a state A, in which it had an internal diameter of 2.54 cm., and then expanding further to an internal diameter of 3.02 cm.

The expanded parts were then recovered in an air oven at 170° C round appropriate mandrels, and the angle $a$ was determined for each of the recovered states. Again, in some cases a part, having been partially recovered once, was removed from the mandrel in question and recovered further round a mandrel of smaller diameter.

The internal diameters of the various states obtained on expansion and recovery are indicated in Tables I and II respectively, while the dimensions measured in each of the states are given in Tables III and IV, Table II referring to the states obtained on expansion, and Table IV referring to those obtained on recovery. Tables V and VI are similar to Tables I and II, but show the shed angles obtained in states A to F and $A_2$ to $F_2$. In the parts before expansion the internal diameter I.D. was 1.90 cm., S.D. was 6.5 cm., O.D. was 2.2 cm., and S.L. was 2.1 ± 0.1 cm.

TABLE I

| Initial internal | Expansion Expanded internal diameter(cm) | | |
|---|---|---|---|
| diameter (cm) | 2.54 | 3.02 | 3.75 |
| 1.90 | A | B | C |
| 2.54 |   | D | E |
| 3.02 |   |   | F |

TABLE II

| Initial internal | Recovery Recovered internal diameter(cm) | | |
|---|---|---|---|
| diameter (cm) | 3.02 | 2.54 | 2.22 |
| 3.75 | $F_2$ | $E_2$ | $C_2$ |

TABLE II-continued

| Initial internal | Recovery Recovered internal diameter(cm) | | |
|---|---|---|---|
| diameter (cm) | 3.02 | 2.54 | 2.22 |
| 3.02 |   | $D_2$ | $B_2$ |
| 2.54 |   |   | $A_2$ |

TABLE III

|   | Expansion | | | | | |
|---|---|---|---|---|---|---|
|   | A | B | C | D | E | F |
| O.D.(cm) | 2.9 | 3.4 | 4.1 | 3.4 | 4.1 | 3.9 |
| S.D.(cm) | 6.6 | 6.5 | 6.1 | 6.7 | 6.1 | 6.2 |
| S.L.(cm) | 2.0 | 2.0 | 2.0 | 2.0 | 2.0 | 2.0 |
| $a°$ | 68 | 51 | 30 | 56 | 30 | 35 |

TABLE IV

|   | Recovery | | | | | |
|---|---|---|---|---|---|---|
|   | $A_2$ | $B_2$ | $C_2$ | $D_2$ | $E_2$ | $F_2$ |
| O.D. (cm) | 2.9 | 2.8 | 2.8 | 2.9 | 2.9 | 3.4 |
| S.D. (cm) | 6.7 | 6.7 | 6.7 | 6.7 | 6.6 | 6.4 |
| S.L. (cm) | 2.0 | 2.0 | 2.0 | 2.0 | 2.0 | 2.0 |
| $a°$ | 72 | 77 | 77 | 72 | 68 | 49 |

TABLE V

| Initial internal | Expansion Expanded internal diameter (cm) | | |
|---|---|---|---|
| diameter (cm) | 2.54 | 3.02 | 3.75 |
| 1.90 | 68 | 51 | 30 |
| 2.54 |   | 56 | 30 |
| 3.02 |   |   | 35 |

TABLE VI

| Initial internal | Recovery Recovered internal diameter (cm) | | |
|---|---|---|---|
| diameter (cm) | 3.02 | 2.54 | 2.22 |
| 3.75 | 49 | 68 | 77 |
| 3.02 |   | 72 | 77 |
| 2.54 |   |   | 72 |

It can be seen from Tables V and VI that, within the limits of experimental error, the shed angle for a part is dependent only on the internal diameter of that part, the same angle $a$ being obtained for a given diameter whether that diameter is the result of expansion from a smaller diameter or recovery from a larger one. If the average shed angle and percentage expansion $$= \frac{\text{(actual internal diameter} - \text{"as molded" internal diameter}) \times 100}{\text{"as molded" internal diameter}}$$

are calculated for each internal diameter, the values given in Table VII are obtained.

TABLE VII

| Internal diameter (cm) | Average shed angle (°) | % Expansion |
|---|---|---|
| 1.90 | 90 | 0 |
| 2.22 | 75 | 15.8 |
| 2.54 | 69 | 33.7 |
| 3.02 | 52 | 59.0 |
| 3.75 | 32 | 97.5 |

Figure 4:
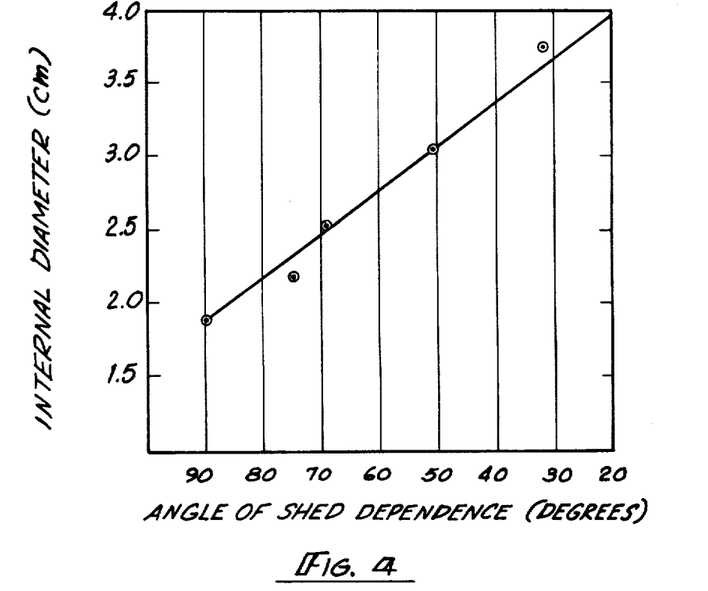
FIG. 4 is a graph of the variation of shed angle with a variation in internal diameter obtained from Example 2.
Figure 5:
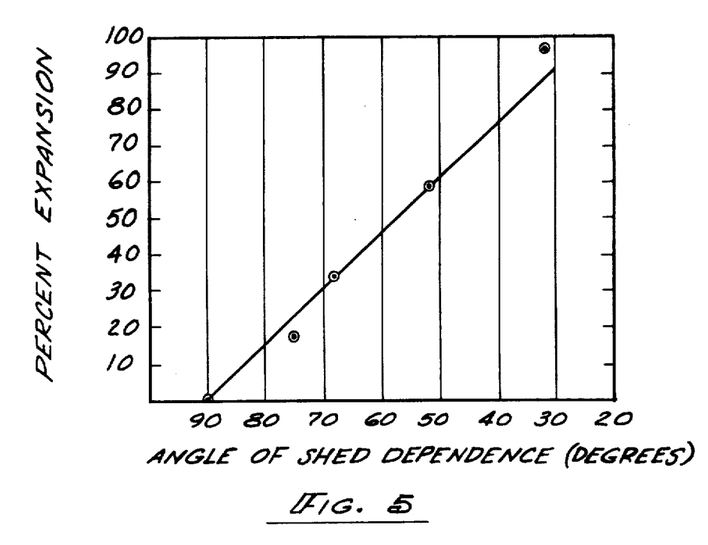
FIG. 5 is a graph of the variation in the shed angle relative to the percent expansion obtained from Example 2.

Plots of these values against the internal diameter are shown in FIGS. 4 and 5.

EXAMPLES 3 - 5

Three sleeves provided with a plurality of sheds were molded from electrically insulating material. In each case the sheds, which were essentially similar to those shown in FIGS. 1 and 6, were substantially perpendicular to the longitudinal axis of the sleeve and were symmetrical about a plane perpendicular to said longitudinal axis. Each sleeve was converted to a heat recoverable form by heating, expanding on a mandrel, and cooling, followed by removal of the mandrel. Each of the heat recoverable articles was then positioned around an appropriate cylindrical fuse and heated to shrink it into close contact with the fuse. In a separate experiment, heat recoverable articles identical to those shrunk around the fuses were heated in the absence of any substrate to determine the fully recovered diameter of the articles.

The inner diameter of the heat recoverable articles and the outer diameter of the fuses, as well as the internal diameter of the fully recovered sleeves are given in the Table below. The Table also gives the percentage unresolved recovery of the sleeves when recovered around the fuses, this being calculated according to the following equation:

$$\% \text{ unresolved recovery} = \frac{\text{outer diameter of fuse} - \text{inner diameter of fully recovered sleeve}}{\text{inner diameter of fully recovered sleeve}} \times 100$$

TABLE

| Example | No. of Sheds | Inner diameter of heat recov. article (in.) | Outer diameter of fuse (in.) | Inner diam. of full recov. sleeve (in.) | % of unresolv. recov. |
|---|---|---|---|---|---|
| 1 | 5 | 2.53 | 2.47 | 2.27 | 8.81 |
| 2 | 8 | 2.78 | 2.72 | 2.50 | 8.79 |
| 3 | 11 | 3.05 | 2.97 | 2.74 | 8.38 |

In each case the sheds of those sleeves that were recovered around the fuses remained substantially perpendicular to the longitudinal axis of the sleeves.

Thus, a composite structure and the method for making that structure which employs easy molding techniques and outwardly extending flanges is disclosed. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A heat recoverable article for covering a substrate, comprising
    a hollow member of heat recoverable material, said hollow member having an elongate cavity of uniform cross section; and
    a plurality of outwardly extending flanges integrally molded with said hollow member and extending around at least a portion of said hollow member, said flanges being heat recoverable adjacent said hollow member, being in substantially identical orientation with one another and being capable of retaining substantially identical orientation with one another upon heat recovery of said hollow member and said flanges about a substrate.

2. The heat recoverable article of claim 1 wherein said flanges are capable of assuming a radial orientation relative to said hollow member upon unrestrained recovery of said hollow member.

3. The heat recoverable article of claim 1 wherein each said flange extends completely around said hollow member.

4. The heat recoverable article of claim 1 wherein said hollow member is substantially cylindrical.

5. The heat recoverable article of claim 4 wherein the inner surface of said hollow member has at least one longitudinally extending deformity therein whereby escape of air from between said hollow member and a substrate about which the hollow member may be recovered is facilitated during recovery of said hollow member.

6. The heat recoverable article of claim 4 wherein said cavity is of substantially polygonal cross section.

7. A kit for a composite article, comprising
    an elongate, substantially cylindrical substrate;
    a hollow member of heat recoverable material, said hollow member having an elongate, substantially cylindrical cavity; and
    a plurality of outwardly extending flanges integrally molded with said hollow member and extending around at least a portion of said hollow member, said flanges being heat recoverable adjacent said hollow member, being in substantially identical orientation with one another and being capable of retaining substantially identical orientation with one another upon heat recovery of said hollow member and said flanges about said substrate.

8. The kit for a composite article of claim 7 wherein said holow member is capable of heat recovery such that the inner dimensions of said hollow member are capable of unrestricted recovery to about between 98% and 87% of the corresponding outer dimensions of said substrate.

9. A method for making a heat recoverable article having a hollow, substantially cylindrical member for covering a substrate and outwardly extending flanges symmetrical about the hollow, substantially cylindrical member including the steps of
    molding said member with radially outwardly extending flanges;
    expanding the member to a first heat recoverable state;
    controlling the orientation of the flanges during expansion of the member; and cooling the member and flanges to a rigid state.

* * * * *